US010402249B2

(12) United States Patent
Xiao et al.

(10) Patent No.: US 10,402,249 B2
(45) Date of Patent: Sep. 3, 2019

(54) METHOD AND APPARATUS FOR FAILURE CLASSIFICATION

(71) Applicant: EMC IP Holding Company LLC, Hopkinton, MA (US)

(72) Inventors: Huibing Xiao, Beijing (CN); Jian Gao, Beijing (CN); Hongpo Gao, Beijing (CN); Geng Han, Beijing (CN); Jibing Dong, Beijing (CN); Shaoqin Gong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 224 days.

(21) Appl. No.: 15/460,682

(22) Filed: Mar. 16, 2017

(65) Prior Publication Data

US 2017/0269985 A1 Sep. 21, 2017

(30) Foreign Application Priority Data

Mar. 16, 2016 (CN) .......................... 2016 1 0151098

(51) Int. Cl.
| | |
|---|---|
| *G06F 11/00* | (2006.01) |
| *G06F 11/07* | (2006.01) |
| *G06F 16/28* | (2019.01) |
| *G06F 16/2457* | (2019.01) |

(52) U.S. Cl.
CPC .... *G06F 11/0766* (2013.01); *G06F 16/24578* (2019.01); *G06F 16/285* (2019.01)

(58) Field of Classification Search
CPC ........................... G06F 11/0766; G06F 11/079

USPC .................................................... 714/26, 48
See application file for complete search history.

(56) References Cited

U.S. PATENT DOCUMENTS

| | | | |
|---|---|---|---|
| 7,539,746 B2 | 5/2009 | Bankier et al. | |
| 8,332,690 B1 * | 12/2012 | Banerjee ............ | G06F 11/0793 714/26 |
| 9,141,658 B1 | 9/2015 | Nair et al. | |
| 10,191,668 B1 | 1/2019 | Traylor et al. | |
| 10,216,558 B1 | 2/2019 | Gaber et al. | |
| 2005/0102591 A1 * | 5/2005 | Matsushita ............ | G01R 31/01 714/724 |
| 2009/0006883 A1 * | 1/2009 | Zhang ................... | G06F 11/366 714/1 |
| 2009/0265585 A1 * | 10/2009 | Ikegami .............. | G06F 11/0793 714/46 |
| 2011/0161743 A1 * | 6/2011 | Kato ................... | G06F 11/0709 714/47.2 |
| 2014/0351642 A1 * | 11/2014 | Bates .................. | G06F 11/0709 714/26 |

(Continued)

*Primary Examiner* — Chae M Ko
(74) *Attorney, Agent, or Firm* — BainwoodHuang (57) ABSTRACT

Embodiments of the present disclosure provide a method and apparatus for classifying a failure. The method comprises obtaining a log associated with a failure and identifying a key event in the log, and the key event indicates a predetermined situation. The method further comprises determining a similarity between the failure and each of a set of historical failures based on the key event, and the set of historical failures have been classified into at least one category. The method further comprises classifying the failure based at least partly on the similarity. Embodiments of the present disclosure enable classifying the failure fast and accurately by determining the similarity associated with key event between failures.

18 Claims, 4 Drawing Sheets

(56) References Cited

U.S. PATENT DOCUMENTS

2016/0116378 A1\* 4/2016 Bates .................. G06N 99/005
                                                    702/182
2017/0116114 A1\* 4/2017 Tosar .................. G06F 11/3684

\* cited by examiner

Fig. 4

METHOD AND APPARATUS FOR FAILURE CLASSIFICATION

RELATED APPLICATIONS

This application claim priority from Chinese Patent Application Number CN201610151098.X, filed on Mar. 16, 2016 at the State Intellectual Property Office, China, titled "METHOD AND APPARATUS FOR CLASSIFYING FAILURE," the contents of which is herein incorporated by reference in its entirety.

FIELD

Embodiments of the present disclosure generally relate to the field of failure processing, and more specifically, to a method and apparatus for automatically classifying a failure.

BACKGROUND

The software often fails during the operating process. In a large and complicated software system with a plurality of components, a plurality of failures may occur during the process of development, testing and operation. Once the software system fails, it is usually necessary to use the experience to determine which component fails based on some the failure phenomenon.

When a software system fails, varied original operating information, such as logs, may be reserved. Generally, failures are classified by analyzing failure phenomenon or logs manually, which would not only consume a large amount of time and energy but also result in low accuracy of failure classification due to limit of knowledge on the person who analyzes the failure. Furthermore, the same failure phenomenon may occur on different components. Therefore, it is generally very difficult to determine which component should be responsible for the failure solely based on the failure phenomenon.

SUMMARY

In view of this, various embodiments of the present disclosure provide a method and apparatus for classifying a failure. Embodiments of the present disclosure enable classifying the failure fast and accurately without knowledge of the specific failure content by determining the similarity associated with key event between an unclassified failure and each of the classified historical failures.

According to an aspect of the present disclosure, there is provided a method for classifying a failure. The method comprises: obtaining a log associated with a failure; identifying a key event in the log, wherein the key event indicates a predetermined situation; determining a similarity between the failure and each of a set of historical failures based on the key event, wherein the set of historical failures have been classified into at least one category; and classifying the failure based at least partly on the similarity.

According to another aspect of the present disclosure, there is provided an apparatus for classifying a failure. The apparatus comprises: a log obtaining unit configured to obtain a log associated with a failure; an event determining unit configured to identify a key event in the log, wherein the key event indicates a predetermined situation; a similarity determining unit configured to determine a similarity between the failure and each of a set of historical failures based on the key event, wherein the set of historical failures have been classified into at least one category; and a failure classifying unit configured to classify the failure based at least partly on the similarity.

According to still another aspect of the present disclosure, there provides an apparatus for classifying a failure. The apparatus comprises a memory and a processor. The processor is coupled to the memory and configured to: obtain a log associated with a failure; identify a key event in the log, wherein the key event indicates a predetermined situation; determine a similarity between the failure and each of a set of historical failures based on the key event, wherein the set of historical failures have been classified into at least one category; and classify the failure based at least partly on the similarity.

BRIEF DESCRIPTION OF THE DRAWINGS

Through the following detailed description with reference to the accompanying drawings, the above and other objectives, features, and advantages of example embodiments of the present disclosure will become more apparent. Several example embodiments of the present disclosure will be illustrated by way of example but not limitation in the drawings in which.

DETAILED DESCRIPTION OF EMBODIMENTS

Various example embodiments of the present disclosure will be described in detail with reference to the accompanying drawings. The flow diagrams and block diagrams in the accompanying drawings illustrate system architecture, functions, and operations which are possibly implemented by the method and system according to various embodiments of the present disclosure. It should be understood that each block in the flow diagrams or block diagrams may represent a unit, a program segment, or a part of code; the unit, program segment, or part of code may include one or more executable instructions for implementing logical functions as prescribed in various embodiments. It should also be noted that in some alternative embodiments, the functions indicated in the blocks may also occur in a sequence different from what is indicated in the drawings. For example, two consecutively expressed blocks actually may be executed substantially in parallel, or they sometimes may be executed in a reversed order, dependent on the involved functions. Likewise, it should be noted that each block in the flow diagrams and/or block diagrams, and a combination of blocks in the flow diagrams and/or block diagrams, may be implemented using a specific hardware-based system that performs prescribed functions or operations, or may be implemented using a combination of specific hardware and computer instructions.

The terms "include," "comprise" and similar terms as used herein should be understood as open terms, that is, "include/comprise, but not limited to." The term "based on"

refers to "based at least partially on." The term "one embodiment" refers to "at least one embodiment". The term "another embodiment" or "a further embodiment" indicates "at least one further embodiment." Relevant definitions of other terms will be provided in the depiction below.

It should be understood that these example embodiments are only provided for enabling those skilled in the art to better understand and then further implement embodiments of the present disclosure, which are not intended to limit the scope of the present invention in any manner.

Figure 1:
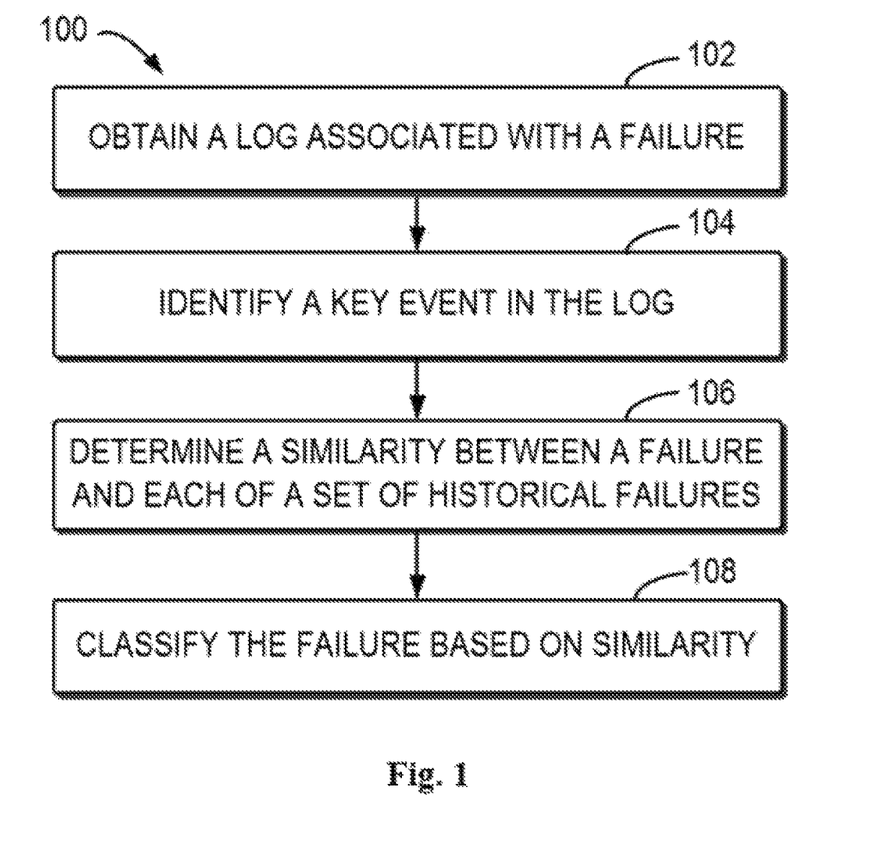
FIG. 1 is a flow diagram illustrating a method for classifying a failure according to the embodiments of the present disclosure.

FIG. 1 is a flow diagram illustrating a method 100 for the classifying a failure according to the embodiments of the present disclosure. At 102, a log associated with failures is obtained. According to the embodiments of the present disclosure, the failure may include a problem, an error and a bug that occurs during the operation of the software. For example, the failure may cause breakdown of the software system, or the failure merely results in some abnormalities that will not affect the normal operation of the software system. The log generally reserves operation information during the operation of the software, which contains records of events from different sources or different components (for example, sub-systems of the software system). In a complicated software system, the file of logs is generally too large to be processed directly to obtain the component which the failure belongs to. In some embodiments, different events contained in the log have different importance. Therefore, the contents in the log may be extracted and different weight may be set for different events.

At 104, a key event is identified in the log, and the key event indicates a predetermined situation. When the software system fails, each component may possibly record some pieces of important information in a dedicated or general-purpose log, which are referred to as a key event. In some embodiments, the key event may include a component and its status. For example, when a component A is not ready yet, the component A would record an event reciting "A . . . not ready" in the log.

In some embodiments, it is determined whether at least one of the predetermined key events exists in the log. If the at least one predetermined key event exists in the log, the at least one predetermined key event is determined as the key event in the log. The predetermined key events are key events of each component that are predetermined manually. Optionally, the predetermined key events may include the events of each component. Alternatively, for the purpose of faster speed and lower power consumption, it is possible to only select some events of important components as predetermined key events. Generally, the bigger the number of predetermined key events is, the better the effect of failure classification will be.

In some embodiments, an event status list for the failure may be set, and the event status list indicates whether each key event of the predetermined key events occurs. In some embodiments, an event status list for the failure may be determined based on the predetermined key events, and the event status list for each of the historical failures may be also determined based on the predetermined key events. For example, the log file may be filtered for each failure to obtain the event status list of the failure. For example, if a certain predetermined key event is hit in the log of the failure, then the value of the certain predetermined key event is set as 1 in the event status list of the failure, that is, it means that the predetermined key event occurs in the log. In some embodiments, it may be determined whether the predetermined key event occurs in the log of the failure by the use of the regular expression.

At 106, the similarity of the key event between the failure and each of a set of historical failures is determined based on the key event, and the set of historical failures have been classified into one or more categories. According to embodiments of the present disclosure, the historical failure events have been assigned to the respective category or component.

In some embodiments, the similarity of the key event between the unclassified failure and the historical failure may be determined by determining the number of common key events between the unclassified failure and the historical failure. In another embodiment, the similarity of the key event between the classified failure and each of the historical failures may be determined by comparing the event status list of the unclassified failure and the event status list of each of the historical failures.

In some embodiment, all the key events can be assigned with the same weight, which indicates that all the key events have the same importance. In another embodiment, different key events can be configured with different weights, and the similarity of the key event between the failure and each of the historical failures may be determined based at least partly on the respective weight. For example, some important key events may be configured with higher weight, compared to the less important key events.

At 108, the failure is classified based at least partly on the similarity of the key event. For example, the failures are classified based on the similarity of the key event that has been determined. Optionally, the failure may be classified to a category corresponding to historical failure with the highest similarity. Alternatively, the category where a plurality of (such as 10) historical failures with the high similarity appear most frequently is considered as the candidate category of the failure. Alternatively or additionally, the failure may be classified based on some other factors apart from the similarity of the key event.

In an embodiment, an example for method 100 for classifying a failure is shown. For example, the software system may include three components, namely, components A, B, and C. In components A, B and C, some predetermined key events that have been defined. For example, the component A includes a "not.ready" event, the component B includes a "not.ready" event, and the component C includes two key events, that are a "not.ready" event and a "Power.Fail" event. These events can be expressed with regular expressions, for example, the regular expressions for matching these events are as follows:

A.not.ready=>sep_shim_vol_state.*NotReady:1
    B.not.ready=>std:Fct*Not Ready reported
    C.not.ready=>strt:DRAMCache.*Notready:1
    C.Fower.Fail=>strt:DRAMCache.*failed due to power failure The following presents an example for a log of a failure generated during the operating process of the software system, which includes a plurality of log entries of the software system generated during the occurrence of the failure.

18:38:24.331    172  FFFFFA8014FD4B60 3  std:INFO OBJ  1DB  100C0 : rg_edge_state_chg_evt_entry: edge index 3, path state 3
18:38:24.331    21  FFFFFA8014FD4B60 3  std:INFO OBJ  1DB  100C0 : fbe_raid_group_set_condition_based_on_downstream_health: RAID is going broken thru RL cond

| | | | | | | | | |
|---|---|---|---|---|---|---|---|---|
| 18:38:24.332 | 4 | FFFFFA801CF0AB60 | 1 | std:INFO | LIB | A | 100C0 : | sep_shim_vol_state:LUN#:0, V_Capacity:0x521c8e00, NotReady:1,attr:0x300012 |
| 18:38:24.332 | 4 | FFFFFA801CF0AB40 | 0 | std:INFO | LIB | A | 100C0 : | sep_shim_vol_state:LUN#:3, V_Capacity:0x521c8e00, NotReady:1,attr:0x300012 |
| 18:38:24.332 | 8 | FFFFFA801CF0AB60 | 1 | std:Fct: VFFFFF8801C8537C0 Not Ready reported for LUN 0 from ProcessEventNotification 0xa |
| 18:38:24.332 | 2 | FFFFFA801CF0A040 | 0 | std:Fct: VFFFFF8801C855E00 Not Ready reported for LUN 3 from ProcessEventNotification 0xa |
| 18:38:24.333 | 2 | FFFFFA801CF0AB60 | 1 | std:INFO | LIB | A | 100C0 : | sep_shim_vol_state:LUN#:1, V_Capacity:0x521c8e00, NotReady:1,attr:0x300012 |
| 18:38:24.333 | 10 | FFFFFA801CF0AB60 | 1 | std:INFO | LIB | A | 100C0 : | sep_shim_vol_state:LUN#:2, V_Capacity:0x521c8e00, NotReady:1,attr:0x300012 |
| 18:38:24.333 | 3 | FFFFFA801CF0AB60 | 1 | std:Fct: VFFFFF8801C854480 Not Ready reported for LUN 1 from ProcessEventNotification 0xa |
| ... | | | | | | | | |
| 18:47:09.756 | 6 | FFFFFA800917A040 | 2 | strt:DRAMCache: Persistence Request failed due to power failure or board poll. |

Through matching, it may be found that the predetermined key events that have been hit in the log include the "not.ready" event of the component A, the "not.ready" event of the component B, and the "Power.Fail" event of the component C, without including the "not.ready" event of the component C. In the event status list, the event that has been hit may be represented as 1, namely, the event status list in the failure may be represented as follows:

A.not.ready=>1
B.not.ready=>1
C.not.ready=>0
C.Power.Fail=>1

It should to be understood that the selection of the key events may be expandable. For example, some components can be configured with more key events, such as an event of the component A having a driver failure and an event of the component B having a failure of the unavailable of a high speed cache. Furthermore, when new components are added to the system, new key events, such as event of a component E having a media error, may be added. For example, the following three predetermined key events may be added:

A.drive.fail=>0
B.cache.disable=>1
E.media.error=>1

Once determining the event status list, the similarity of the key event between failure and each of the historical failures may be determined based on the event status list. For example, the content of the event status list may be represented with vector E-status. For example, for an unclassified failure, E-status=[E0, E1, E2, . . . , En], where if an $i^{th}$ event is hit in the log of the unclassified failure, then Ei=1; otherwise, if the $i^{th}$ event is not hit in the log of the unclassified failure, then Ei=1. For each of the historical failures, E-status'=[E0', E1', E2', . . . , En'], where if an $i^{th}$ event is hit in the log of a particular historical failure, then Ei'=1; otherwise, if $i^{th}$ event is not hit in the log of a particular historical failure, then Ei'=1.

Next, each event in the event status list may be weighted. Then the similarity associated to the key event between the unclassified failure and the particular historical failure may be calculated by the following Equation (1):

$$S' = \rho_{i=0}^{n} Wi * Ei * Ei' \quad (1)$$

Where S' denotes the similarity score between the unclassified failure and the particular historical failure, Wi denotes the weight of an $i^{th}$ key event, and the weight may be set based on importance of the event, Ei denotes the hit state of $i^{th}$ event for the unclassified failure, and Ei' denotes the hit state of $i^{th}$ event for particular historical failure. Furthermore, to make the similarity score fall between 0 and 1, it may be normalized with the following Equation (2):

$$S = S'/Smax; \quad (2)$$

Where S denotes the similarity score after the normalization, Smax is the maximum value of S'. Then, the failure is classified based on the similarity score S of the determined key event. For example, the failure may be classified to a category corresponding to historical failure with the highest similarity of the key event, or the category where a plurality of (such as 10) historical failures with the highest key event similarity appear most frequently may be considered as the category of the failure. Alternatively, the failures may be classified based on some other factors other than the similarity of the key event.

In some embodiments, a subset of the set of historical failures may be determined based on the similarity, and another similarity associated with a predetermined failure characteristic between the failure and each of the subset of historical failures may be also determined. The predetermined failure characteristic may include at least one of a recency value (that is, the time for the occurrence of the unclassified failure), a state (that is, the current processing state of the failure), a release number, a version number and a duplication value (that is, the times for the failure to be repeated). As such, the unclassified failure may be classified based on the similarity and the other similarity. In other words, apart from the similarity of the key event, similarity of other predetermined failure characteristics may also be determined, and the failure may be classified based on the similarity of key events and the predetermined failure characteristics.

In some embodiment, the similarity of each of the particular characteristics may be determined separately. For example, a first similarity (for example a recency score) associated with the recency value may be determined by comparing timestamp information of the unclassified failure and each of the subset of historical failures. A second similarity (for example a state score) associated with the state may be determined by determining a current state of each of the subset of historical failures. A third similarity (for example a release score) associated with the release number may be determined by comparing release numbers associated with failed applications in which the unclassified failure and each of the subset of historical failures occur respectively. A fourth similarity (for example a version score) associated with the version number may be determined by comparing version numbers associated with failed applications in which the unclassified failure and each of the subset of historical failures occur respectively. A fifth similarity (for example a duplication score) associated with the duplication value may be determined by determining a number of times that the unclassified failure repeats in the set of historical failures. In some embodiments, the similarity and the other similarity may be weighted by a first weight and a second weight respectively, and, a weighted similarity between the failure and each of the subset of historical failures may be determined based on the similarity, the other similarity and the first and second weights, and the failure may be classified based on the weighted similarity In some embodiments, it is possible to obtain information related to other characteristics from a system log or a system database. For example, information of other characteristics may be gathered from the log file. Information of other characteristics that are not available from the log file itself may be gathered from a live system or other resources. It is possible to obtain information in real time or build a database to store information related to the failure beforehand. The obtained information may represent correlation or relevancy between failures to a large extent. For example, a recency score, a state score, a release score, a version score and a duplication score associated with the failure may be calculated.

Recency Score

Recency is defined to measure temporal proximity between two failures. After obtaining the timestamp information of failures, all the failures are sequenced based on the timestamp information of the failures. Each failure may be classified as an unique T# of a timestamp sequence #. Hence, T# is a unique serial number from 0 to N to mark the timeline for the occurrence of failures, where N denotes the total of all the available failures. The recency score between the unclassified failure and the particular historical failure may be calculated with the following Equation (3):

$$R = e^{-(Tu-Ta)^2/L^2} \quad (3)$$

Where R denotes the recency score between the unclassified failure and the particular historical failure. Since the value of R has been normalized in Equation (3), R is between 0-1. Tu denotes the timestamp sequence T# for the unclassified failure, Ta denotes the timestamp sequence T# for particular historical failure, and L denotes the bandwidth parameter weighted on the most recent failure, which indicates that failures preceding L or around L should be given more attention. In another embodiment, the default value of L may be set as 10000. In another embodiment, the recency score may be also determined by calculating the time interval between failures.

State Score

A failure would undergo varied states from the beginning to the end, and the state of the failure denotes the development of failure processing by a specified category. For example, a failure may have the following five processing states: when the failure is firstly generated, its state is WAITING_ASSIGN; then it is classified to the respective working staff for processing, and its state is "IN_PROGRESS"; if the working staff obtains the root cause of the failure, he/she would set the state of the failure as "ROOT_CAUSE_KNOWN". Then it comes to the fixing process, namely, entering state "FIX_IN_PROGRESS". Finally, when the fixing process has been completed, the state turns to "FIXED". Therefore, the sequence of example analysis state for the failure may be as follows:

WAITING_ASSIGN(0)—>IN_PROGRESS(1)—
>ROOT_CAUSE_KNOWN(2)—>FIX_IN-
_PROGRESS(3)—>FIXED(4)

As indicated by the above sequence, if the state of the failure denotes recency value, the failure will be scored higher. Generally, the newly generated historical failures, are more likely to be relevant to the unclassified failure, while the fixed failures are less likely to be relevant to the unclassified failure. Therefore, for a failure having M states, the state score for a particular historical failure may be calculated with the following Equation (4):

$$Sv = 1 - \frac{Os}{N} \quad (4)$$

Where Sv denotes the state score of the failure, ranging from 0 to 1, Os denotes the sequence of the current state of the failure in all states, for example, the sequence of state "IN_PROGRESS" is 1, N denotes the value of score under the normalization state, where N≥M. For example, N may be set to 10 and then the state score of the failure with the current state of "IN_PROGRESS" is 0.9 while the state score of the failure with the current state of "FIXED" is 0.6, which also indicates that the heat score of failures that are being processed may be higher than others. However, the above state sequence and Equation (4) only present, an example and may include other state sequence, and the state score of the failure may be calculated based on the current state of the failure.

Release Score

In an engineering organization, many different releases may be developed for the same product. In general, there is a greater correlation between the two software with the same release number, compared to two software with different release numbers. The release information may be obtained from the system which generates the failure. In an embodiment, if the release number of a software having an unclassified failure is the same as the software having a particular historical failure, then the score of the release number may be determined to be 1. Otherwise, the score of the release number may be determined to be 0. In some embodiments, if the release number may be sequenced according to the release time or order, the score of release number of the failure may be calculated based on the sequence gap between release numbers of software with the following Equation (5).

$$Rv = 1 - \frac{|s-S|}{S_{max}} \quad (5)$$

Where Rv denotes the release number score of the failure, Smax represents the biggest serial number of the available release number, s denotes the serial number of the release number of the software having a particular historical failure, and S denotes the serial number of the release number of the software having an unclassified failure. As can be seen from Equation (5), the nearer the release numbers of software are, the higher the score of the release number will be. According to another embodiment of the present disclosure, if failures occur more frequently at a particular release number, the release number may be configured with higher score.

Version Score

In an engineering organization, many different versions may be developed for the same product. In general, there is a greater correlation between the two software with the same version number, compared to two software with different version numbers. The version information may be obtained from the system which generates the failure. In an embodiment, if the version number of a software having an unclassified failure is the same as the software having a particular historical failure, then the score of the version number may be determined to be 1. Otherwise, the score of the version number is determined to be 0. In another embodiment, if the version number can may sequenced according to the version time or order, the score of version number of the failure can be calculated based on the sequence gap between the version numbers of software with the following Equation (6):

$$V = 1 - \frac{|s - S|}{S_{max}} \quad (6)$$

Where V denotes the release number score of the failure, Smax represents the biggest serial number of the available version number, s denotes the serial number of the version number of the software having a particular historical failure, S denotes the serial number of the version number of the software having an unclassified failure. As can be seen from Equation (6), the nearer the version numbers of software are, the higher the score of the version number will be. According to another embodiment of the present disclosure, if failures occur more frequently at a particular version number, the version number can be configured with higher score.

Duplication Score

Generally speaking, same failures will be identified during analysis or debugging of historical failures, and the failure duplication information will, be stored in the database. Alternatively, the times of the duplication of the same failure may be recorded during the state analysis process of the failure. Generally, the more frequently the failure is repeated, the more likely it is for the failure to arise and greater attention and popularity will be distributed to the failure, and thus greater possibility of correlation between the failure and the unclassified failure. The duplication score of the failure is calculated based on the accumulated duplication number of a particular historical failure in all the particular historical failures. For instance, the duplication score of the failure may be calculated with the following Equation (7):

$$Dv = \frac{Cd}{D} \quad (7)$$

Where Dv denotes the duplication score of the failure, ranging between 0 and 1, Cd denotes the times of duplication of the failure, D denotes the highest number of failure duplication among all the historical failures. If the value of D is 0, then its default value may be set to 1.

After calculating the score of each of the other characteristics separately (for example, R, Sv, Rv, V and Dv), the score of other characteristics may be calculated according to the weight of each of the other characteristics. According to an embodiment of the present disclosure, the same weight may be configured between the other characteristics and then the score of other characteristics equals to a sum of the score of each characteristic (for example, R, Sv, Rv, V and Dv). In another embodiment, the weight between other characteristics may be configured differently. Then the similarity score of other characteristics can be calculated as a whole based on their respective weight. For instance, the similarity score of other characteristics=a1×R+a2×Sv+a3×Rv+a4×V+a5×Dv, where a1-a5 denote the weight of each particular characteristic respectively.

In some embodiments, a predetermined number of historical failures based on the weighted similarity may be selected from the subset of historical failures. Categories of the predetermined number of historical failures are analyzed statistically, and a category to which the failure is to be classified may be selected from the categories. In some embodiments, if the statistic times of one and another category are the same, then the category corresponding to the failure with the highest score among failures of the two categories is selected as the final category. In some embodiments, a K-nearest neighbor (KNN) algorithm may be used to implement the statistic process of the embodiments of the present disclosure.

In an embodiment, the actions in the method 100 may be performed for a given failure with the name "coherence_error_2015-11-23_780321". In this embodiment, statistics may be made for category of top 9 particular historical failures in terms of total similarity score. According to the result of statistics, in the top 9 list, the category that appears most frequently is "MCx:MCC", three times in total. Therefore, the automatic failure category of event #68062 is "MCx:MCC".

TABLE 1

Scores of top 9 failures in terms of total similarity score

| Failure# | Total score | Key event | Recency Value | State | Release number | Version number | Duplication value | Category |
|---|---|---|---|---|---|---|---|---|
| 784827 | 3.726 | 1.000 | 0.826 | 0.900 | 1.000 | 0.000 | 0.000 | MCx: MCC |
| 779820 | 3.697 | 1.000 | 0.997 | 0.700 | 1.000 | 0.000 | 0.000 | MCx: MCC |
| 778290 | 3.684 | 1.000 | 0.984 | 0.700 | 1.000 | 0.000 | 0.000 | MCx: MCC |
| 776635 | 3.624 | 1.000 | 0.924 | 0.700 | 1.000 | 0.000 | 0.000 | EMSD VNX Storage Efficiency: Efficiency-Dedupe |
| 774991 | 3.553 | 1.000 | 0.853 | 0.700 | 1.000 | 0.000 | 0.000 | Auto AR Triage: Auto AR Triage |
| 774988 | 3.553 | 1.000 | 0.853 | 0.700 | 1.000 | 0.000 | 0.000 | Client Framework: REST API Framework |
| 768238 | 2.465 | 1.000 | 0.465 | 0.000 | 1.000 | 0.000 | 0.000 | Client Framework: REST API Framework |
| 757778 | 2.074 | 1.000 | 0.074 | 1.000 | 0.000 | 0.000 | 0.000 | System Test: Serviceability |
| 757666 | 1.072 | 1.000 | 0.072 | 0.000 | 0.000 | 0.000 | 0.000 | Platform Services: App Services-Misc |

Thus, the embodiments of the present disclosure can achieve fast and automatic classification of failures. For example, according to some embodiments of the present disclosure, the accuracy of the automatic failure classification method of the present disclosure exceeds 60% while the accuracy of traditional manual failure classification method is usually only 50%. Therefore, the embodiments of the present disclosure can achieve more accurate automatic classification of failures.

Figure 2:
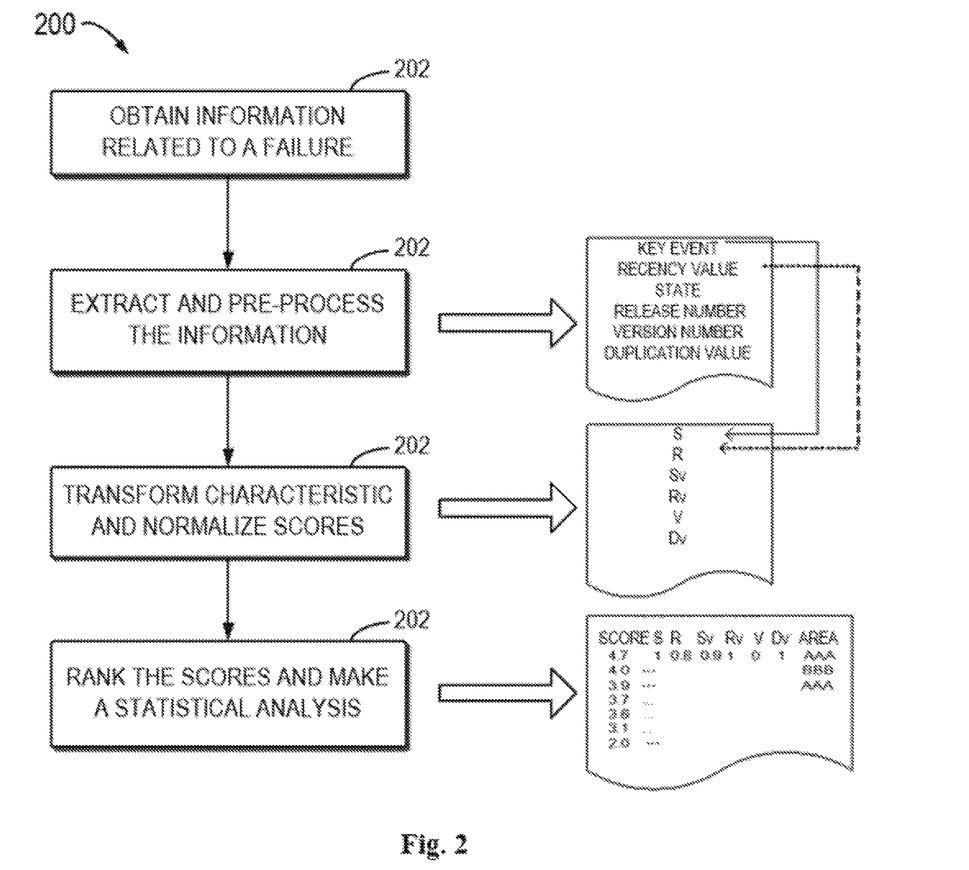
FIG. 2 is a flow diagram illustrating a method for classifying a failure according to another embodiment of the present disclosure.

FIG. 2 illustrates a flow diagram of a method 200 for classifying a failure according to another embodiment of the present disclosure. At 202, information related to failures is obtained. For example, information related to key event may be obtained. Alternatively, one or more of recency information, state information, release number information or duplication information may be obtained. At 204, the obtained information are extracted and pre-processed so that the information may be converted into a standard format that may be calculated. At 206, characteristic transformation may be performed, and the similarity score of the respective characteristics (for example, S, R, Sv Rv, V or Dv described above) may be determined. For example, each characteristic score may be normalized so that the characteristic score is between 0 and 1. At 208, a total score may be determined based on each characteristic score (for example, perform weight calculation based on the weight of each characteristic). The scores of the relevant historical failures are ranked, and a statistical analysis may be made. For example, the category corresponding to top K (for instance, K=10) failures for statistical purpose (for example, in top 10, AAA category appears for 5 times and BBB category appears for 3 times) may be selected, and the category with the highest relevancy based on the result of statistics (for example, the AAA category) for classification may be selected.

Figure 3:
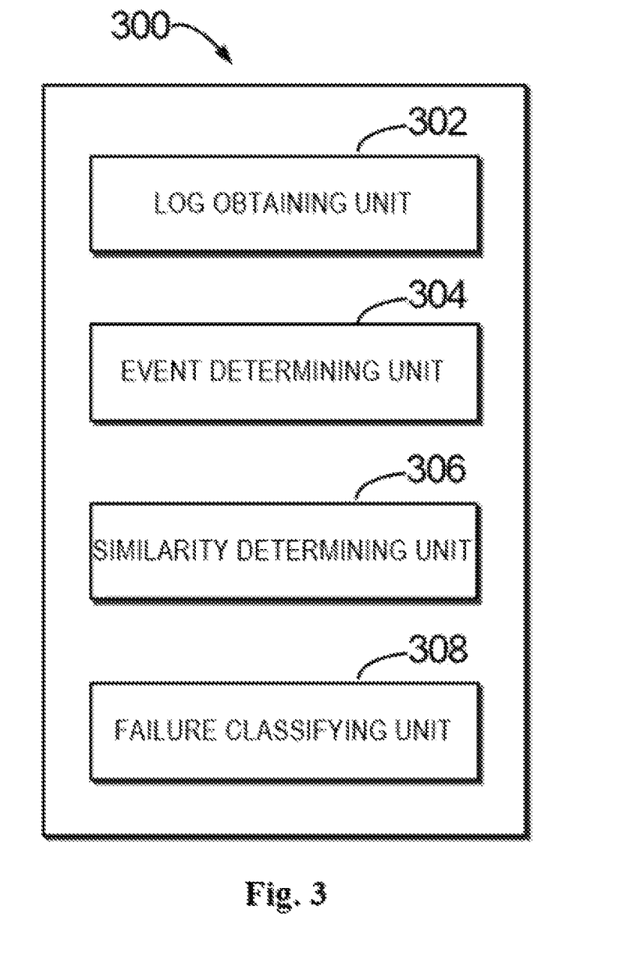
FIG. 3 is a block diagram illustrating an apparatus for classifying a failure according to the embodiments of the present disclosure.

FIG. 3 illustrates a block diagram of an apparatus 300 for automatic classification of failures according to the embodiments of the present disclosure. The apparatus 300 includes a log obtaining unit 302 configured to obtain a log associated with a failure and an event determining unit 304 configured to identify a key event in the log, and the key event indicates a predetermined situation. The apparatus 300 further includes a similarity determining unit 306 configured to determine a similarity between the failure and each of a set of historical failures based on the key event and a failure classifying unit 308 configured to classify the failure based at least partly on the similarity, and the set of historical failures have been classified into at least one category.

It should be understood that the apparatus 300 may be implemented in various manners. For example, in some embodiments, the apparatus 300 may be implemented in hardware, software or a combination of hardware and software, where the hardware part can be implemented by a special logic; the software part can be stored in a memory and executed by a suitable instruction execution system such as a microprocessor or a special purpose hardware. Those skilled in the art may understand that the above method and system may be implemented with computer executable instructions and/or in processor-controlled code, for example, such code is provided on a carrier medium such as a magnetic disk, CD, or DVD-ROM, or a programmable memory such as a read-only memory, or a data bearer such as an optical or electronic signal bearer. The apparatuses and their units in the present disclosure may be implemented by hardware circuitry of a programmable hardware device such as a hyper-scale integrated circuit or gate array, a semiconductor such as a logical chip or transistor, or hardware circuitry of a programmable hardware device such as a field-programmable gate array or a programmable logical device, or implemented by software executed by various processors, or implemented by any combination of the above hardware circuitry and software.

Figure 4:
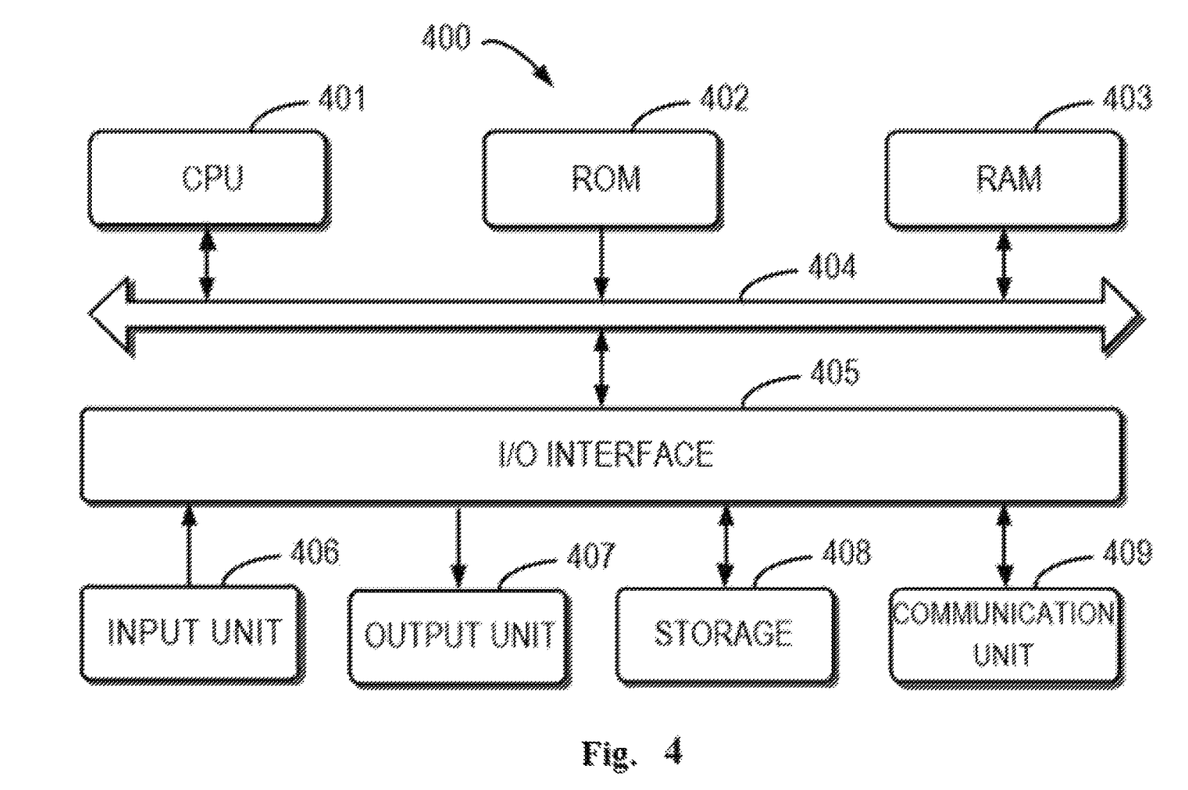
FIG. 4 is a schematic block diagram illustrating an apparatus that can be used to implement the embodiments of the present disclosure.

FIG. 4 is a schematic block diagram illustrating an apparatus 400 that may be used to implement the embodiments of the present disclosure. As shown, the apparatus 400 includes a Central Processing Unit (CPU) 401 which may perform various suitable actions and processing based on computer program instructions stored in Read Only Memory (ROM) 402 or computer program instructions uploaded from storage unit 408 to the Random Access Memory (RAM) 403. The RAM 403 stores various programs and data needed by operation of the apparatus 400. The CPU 401, ROM 402 and RAM 403 are connected one another via a bus 404. The input/output (I/O) interface 405 can also be connected to the bus 404.

The following components in device 400 are connected to the I/O interface 405: including: an input unit 406, such as a keyboard, a mouse, and the like; an output unit 407, such as display of various types and loudspeakers; a storage 408, such as magnetic disk and optical disk; a communication unit 409, such as network card, modem, wireless communication transceiver. The communication unit 409 allows device 400 to exchange data/information with other devices via computer networks, such as Internet, and/or telecommunication networks.

The processes and processing described above, the method 100 for instance, may be executed by processing unit 401. For example, in some embodiments, the method 100 may be implemented as a computer software program which is corporeally contained in a machine readable medium, such as storage unit 408. In some embodiments, the computer program can be partly or wholly loaded and/or mounted on device 400 by ROM 402 and/or the communication unit 409. When the computer program is uploaded to RAM 403 and executed by CPU 401, one or more actions of method 100 described above may be executed.

It will be noted that although various units or sub-units of the apparatus have been mentioned in the above detailed description, such partitioning is not for limitation. In practice, according to the embodiments of the present invention, the features and functions of two or more units described above may be embodied in one block. In turn, the features and functions of one unit described above may be further embodied in more units.

The present descriptions above are only optional embodiments, not intended to limit the embodiments of the present disclosure. To those skilled in the art, embodiments of the present disclosure may have various modifications and variations. Any modifications, equivalent replacements, and improvements within the spirit and principle of embodiments of the present disclosure should be included within the protection scope of embodiments of the present disclosure.

Although the present disclosure has been described with reference to various embodiments, it should be understood that the present disclosure is not limited to the disclosed embodiments. The present disclosure is intended to cover various modifications and equivalent arrangements included in the spirit and scope of the appended claims. The scope of the appended claims meets the broadest explanations and covers all such modifications and equivalent structures and functions.

We claim:

1. A method for classifying a failure, comprising:
obtaining a log associated with a failure;

identifying a key event in the log, the key event indicating a predetermined situation;

determining a similarity between the failure and each of a set of historical failures based on the key event, the set of historical failures having been classified into at least one category; and classifying the failure based at least partly on the similarity, the classifying of the failure including (i) determining a subset of the set of historical failures based on the similarity, (ii) determining another similarity associated with a predetermined failure characteristic between the failure and each of the subset of historical failures, the predetermined failure characteristic including at least one of a recency value, a state, a release number, a version number, and a duplication value, and (iii) classifying the failure based on the similarity and the other similarity.

2. The method according to claim 1, wherein the identifying a key event in the log comprises:

determining whether at least one of the one or more predetermined key events exists in the log; and in response to determining the at least one predetermined key event exists in the log, determining the at least one predetermined key event as the key event in the log.

3. The method according to claim 1, wherein the determining a similarity between the failure and each of a set of historical failures comprises:

determining, based on an event status list indicating whether one or more predetermined key events occurs, the similarity between the failure and each of the set of historical failures.

4. The method according to claim 1, wherein the determining a similarity between the failure and each of a set of historical failures comprises:

determining a first event status list of the failure according to one or more predetermined key events;

determining a second event status list of each of the set of historical failures according to the one or more predetermined key events; and determining the similarity between the failure and each of the historical failures by comparing the first and second event status lists, the first and second event status lists indicating whether the one or more predetermined key event occurs.

5. The method according to claim 4, wherein the determining a similarity between the failure and each of a set of historical failures further comprises:

setting respective weight for individual key event in the one or more predetermined key events; and determining the similarity between the failure and each of the historical failures based at least partly on the respective weight.

6. The method according to claim 1, wherein the classifying the failure comprises:

weighting the similarity and, the other similarity by a first weight and a second weight respectively;

determining a weighted similarity between the failure and each of the subset of historical failures based on the similarity, the other similarity and the first and second weights; and classifying the failure based on the weighted similarity.

7. The method according to claim 1, wherein the determining another similarity comprises at least one of the following:

determining a first similarity associated with the recency value by comparing timestamp information of the failure and each of the subset of historical failures;

determining a second similarity associated with the state by determining a current state of each of the subset of historical failures;

determining a third similarity associated with the release number by comparing release numbers associated with failed applications in which the failure and each of the subset of historical failures occur respectively;

determining a fourth similarity associated with the version number by comparing version numbers associated with failed applications in which the failure and each of the subset of historical failures occur respectively; and determining a fifth similarity associated with the duplication value by determining a number of times that the failure repeats in the set of historical failures.

8. The method according to claim 6, wherein the classifying the failure comprises:

selecting, from the subset of historical failures, a predetermined number of historical failures based on the weighted similarity;

analyzing statistically categories of the predetermined number of historical failures; and selecting, from the categories, a category to which the failure is to be classified.

9. A system, comprising:

a data storage system; and computer-executable program logic encoded in memory of one or more computers enabled for classifying a failure, wherein the computer-executable program logic is configured for the execution of:

obtaining a log associated with a failure;

identifying a key event in the log, the key event indicating a predetermined situation;

determining a similarity between the failure and each of a set of historical failures based on the key event, the set of historical failures having been classified into at least one category; and classifying the failure based at least partly on the similarity, the classifying of the failure including (i) determining a subset of the set of historical failures based on the similarity, (ii) determining another similarity associated with a predetermined failure characteristic between the failure and each of the subset of historical failures, the predetermined failure characteristic including at least one of a recency value, a state, a release number, a version number, and a duplication value, and (iii) classifying the failure based on the similarity and the other similarity.

10. The system of claim 9, wherein the identifying a key event in the log comprises:

determining whether at least one of the one or more predetermined key events exists in the log; and in response to determining the at least one predetermined key event exists in the log, determining the at least one predetermined key event as the key event in the log.

11. The system of claim 9, wherein the determining a similarity between the failure and each of a set of historical failures comprises:

determining, based on an event status list indicating whether one or more predetermined key events occurs, the similarity between the failure and each of the set of historical failures.

12. The system of claim 9, wherein the determining a similarity between the failure and each of a set of historical failures comprises:

determining a first event status list of the failure according to one or more predetermined key events;

determining a second event status list of each of the set of historical failures according to the one or more predetermined key events; and determining the similarity between the failure and each of the historical failures by comparing the first and second event status lists, the first and second event status lists indicating whether the one or more predetermined key event occurs.

13. The system of claim 12, wherein the determining a similarity between the failure and each of a set of historical failures further comprises:

setting respective weight for individual key event in the one or more predetermined key events; and determining the similarity between the failure and each of the historical failures based, at least partly on the respective weight.

14. The system of claim 9, wherein the classifying the failure comprises:

weighting the similarity and the other similarity by a first weight and a second weight respectively;

determining a weighted similarity between the failure and each of the subset of historical failures based on the similarity, the other similarity and the first and second weights; and classifying the failure based on the weighted similarity.

15. The system of claim 9, wherein the determining another similarity comprises at least one of the following:

determining a first similarity associated with the recency value by comparing timestamp information of the failure and each of the subset of historical failures;

determining a second similarity associated with the state by determining a current state of each of the subset of historical failures;

determining a third similarity associated with the release number by comparing release numbers associated with failed applications in which the failure and each of the subset of historical failures occur respectively;

determining a fourth similarity associated with the version number by comparing version numbers associated with failed applications in which the failure and each of the subset of historical failures occur respectively; and determining a fifth similarity associated with the duplication value by determining a number of times that the failure repeats in the set of historical failures.

16. The system of claim 14, wherein the classifying the failure comprises:

selecting, from the subset of historical failures, a predetermined number of historical failures based on the weighted similarity;

analyzing statistically categories of the predetermined number of historical failures; and selecting, from the categories, a category to which the failure is to be classified.

17. A computer program product for classifying a failure, the computer program product comprising:

a non-transitory computer readable medium encoded with computer-executable code, the code configured to enable the execution of:

obtaining a log associated with a failure;

identifying a key event in the log, the key event indicating a predetermined situation determining a similarity between the failure and each of a set of historical failures based on the key event, the set of historical failures having been classified into at least one category; and classifying the failure based at least partly on the similarity, the classifying of the failure including (i) determining a subset of the set of historical failures based on the similarity, (ii) determining another similarity associated with a predetermined failure characteristic between the failure and each of the subset of historical failures, the predetermined failure characteristic including at least one of a recency value, a state, a release number, a version number, and a duplication value, and (iii) classifying the failure based on the similarity and the other similarity.

18. The computer program product of claim 17, wherein the identifying a key event in the log comprises:

determining whether at least one of the one or more predetermined key events exists in the log; and in response to determining the at least one predetermined key event exists in the log, determining the at least one predetermined key event as the key event in the log.

\* \* \* \* \*